US012135520B2

(12) United States Patent
Watanabe et al.

(10) Patent No.: US 12,135,520 B2
(45) Date of Patent: Nov. 5, 2024

(54) BELT CLEANING BLADE, PHOTORECEPTOR CLEANING BLADE, IMAGE FORMING APPARATUS, TRANSFER DEVICE, AND CLEANING DEVICE

(71) Applicant: FUJIFILM BUSINESS INNOVATION CORP., Tokyo (JP)

(72) Inventors: Yusuke Watanabe, Kanagawa (JP); Daisuke Tano, Kanagawa (JP); Yoshiro Yamashita, Kanagawa (JP); Kenta Shingu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/354,301

(22) Filed: Jul. 18, 2023

(65) Prior Publication Data

US 2024/0053701 A1 Feb. 15, 2024

(30) Foreign Application Priority Data

Aug. 5, 2022 (JP) ................................. 2022-125775
Mar. 27, 2023 (JP) ................................. 2023-050634

(51) Int. Cl.
*G03G 21/00* (2006.01)
*G03G 15/16* (2006.01)

(52) U.S. Cl.
CPC ....... *G03G 21/0017* (2013.01); *G03G 15/161* (2013.01)

(58) Field of Classification Search
CPC .......................... G03G 21/0017; G03G 15/161
See application file for complete search history.

(56) References Cited

U.S. PATENT DOCUMENTS

| | | | | |
|---|---|---|---|---|
| 2014/0086624 A1* | 3/2014 | Kojima | G03G 21/0017 399/350 |
| 2017/0068206 A1* | 3/2017 | Tano | G03G 21/1814 |
| 2023/0152734 A1* | 5/2023 | Sugiura | G03G 15/161 399/101 |

FOREIGN PATENT DOCUMENTS

| | | |
|---|---|---|
| JP | H11-253289 A | 9/1999 |
| JP | 2014-136195 A | 7/2014 |
| JP | 2015-175111 A | 10/2015 |
| JP | 2016-014740 A | 1/2016 |
| JP | 2017-049558 A | 3/2017 |

* cited by examiner

*Primary Examiner* — Stephanie E Bloss
*Assistant Examiner* — Michael A Harrison
(74) *Attorney, Agent, or Firm* — Oliff PLC

(57) ABSTRACT

A belt cleaning blade has a contact site that comes into contact with at least a surface of a belt which is a member to be cleaned, in which the contact site is configured with polyurethane rubber including hard segments and soft segments, and in a cross section of the contact site, a ratio X of domains of the hard segments to a total area of the cross section is 14.9% or more and 25.1% or less, and a ratio Y of an area of domains of the hard segments having an area of 200 $nm^2$ or more and 1,000 $nm^2$ or less to a total area of the domains of the hard segments in the cross section is 17.8% or more and 46.5% or less.

20 Claims, 2 Drawing Sheets

BELT CLEANING BLADE, PHOTORECEPTOR CLEANING BLADE, IMAGE FORMING APPARATUS, TRANSFER DEVICE, AND CLEANING DEVICE

CROSS-REFERENCE TO RELATED APPLICATIONS

This application is based on and claims priority under 35 USC 119 from Japanese Patent Application No. 2022-125775 filed Aug. 5, 2022 and No. 2023-050634 filed Mar. 27, 2023.

BACKGROUND

(i) Technical Field

The present disclosure relates to a belt cleaning blade, a photoreceptor cleaning blade, an image forming apparatus, a transfer device, and a cleaning device.

(ii) Related Art

In an image forming apparatus (such as a copy machine, a facsimile machine, or a printer) using an electrophotographic method, sometimes a cleaning blade is used for cleaning the adhered toner.

For example, JP2016-14740A describes a cleaning blade having a contact site that comes into contact with at least a member to be cleaned and is configured with a polyurethane member containing a polyurethane material containing a hard segment and a soft segment, in which a proportion of an area of a hard segment aggregate having a diameter in a range of 0.3 μm or more and 0.7 μm or less is 2% or more and 10% or less in a cross section of the polyurethane member.

JP2017-49558A describes a cleaning blade having a contact site that comes into contact with at least a member to be cleaned and is configured with a polyurethane member containing polyurethane containing a hard segment component and a soft segment component, in which a domain particle size of the hard segment component is 45 nm or more and 100 nm or less.

SUMMARY

Aspects of non-limiting embodiments of the present disclosure relate to a belt cleaning blade that has a contact site that comes into contact with at least a surface of a belt which is a member to be cleaned and containing polyurethane rubber including a hard segment and a soft segment, the belt cleaning blade having higher abrasion resistance and higher chipping resistance compared to a cleaning blade that has a contact site in which a ratio X of domains of the hard segments to a total area of a cross section of the contact site is less than 14.9% or more than 25.1%, or a ratio Y of an area of domains of the hard segments having an area of 200 $nm^2$ or more and 1,000 $nm^2$ or less to a total area of the domains of the hard segments in the cross section is less than 17.8% or more than 46.5%.

Aspects of non-limiting embodiments of the present disclosure relate to a photoreceptor cleaning blade that has a contact site that comes into contact with a surface of a photoreceptor which has a surface friction coefficient of 0.85 or more and containing polyurethane rubber including a hard segment and a soft segment, the photoreceptor cleaning blade having higher cleanliness and higher chipping resistance compared to a photoreceptor cleaning blade that has a contact site in which a ratio X of domains of the hard segments to a total area of a cross section of the contact site is less than 14.9% or more than 25.1%, or a ratio Y of an area of domains of hard segments having an area of 200 $nm^2$ or more and 1,000 $nm^2$ or less to the total area of the domains of the hard segments in the cross section is less than 17.8% or more than 46.5%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above problems include the following aspect.

According to an aspect of the present disclosure, there is provided a belt cleaning blade having a contact site that comes into contact with at least a surface of a belt which is a member to be cleaned, in which the contact site is configured with polyurethane rubber including a hard segment and a soft segment, and in a cross section of the contact site, a ratio X of domains of the hard segments to a total area of the cross section is 14.9% or more and 25.1% or less, and a ratio Y of an area of domains of the hard segments having an area of 200 $nm^2$ or more and 1,000 $nm^2$ or less to a total area of the domains of the hard segments in the cross section is 17.8% or more and 46.5% or less.

BRIEF DESCRIPTION OF THE DRAWINGS

Exemplary embodiment(s) of the present invention will be described in detail based on the following figures, wherein.

DETAILED DESCRIPTION

Figure 1:
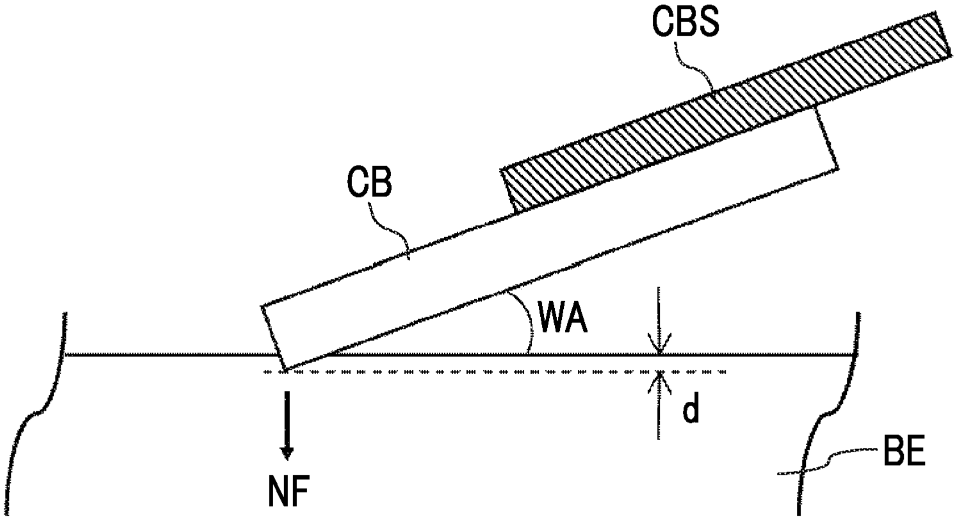
FIG. 1 is a schematic view illustrating a condition of contact between a belt and a belt cleaning blade according to the present exemplary embodiment.

Hereinafter, the present exemplary embodiment as an example of the present invention will be described. The following descriptions and examples merely illustrate exemplary embodiments, and do not limit the scope of the exemplary embodiments.

Regarding the ranges of numerical values described in stages in the present exemplary embodiment, the upper limit or lower limit of a range of numerical values may be replaced with the upper limit or lower limit of another range of numerical values described in stages. Furthermore, in the present exemplary embodiment, the upper limit or lower limit of a range of numerical values may be replaced with values described in examples.

In the present exemplary embodiment, the term "step" includes not only an independent step but a step which is not clearly distinguished from other steps as long as the intended goal of the step is achieved.

In the present exemplary embodiment, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present exemplary embodiment, each component may include a plurality of corresponding substances. In a case where the amount of each component in a composition is mentioned in the present exemplary embodiment, and there are two or more substances corresponding to each component in the composition, unless otherwise specified, the amount of each component means the total amount of two or more substances present in the composition.

Belt Cleaning Blade

The belt cleaning blade according to the present exemplary embodiment has a contact site that comes into contact with at least a surface of a belt which is a member to be cleaned, in which the contact site is configured with polyurethane rubber including a hard segment and a soft segment, and in a cross section of the contact site, a ratio X of domains of the hard segments to a total area of the cross section is 14.9% or more and 25.1% or less, and a ratio Y of an area of domains of the hard segments having an area of 200 $nm^2$ or more and 1,000 $nm^2$ or less to a total area of the domains of the hard segments in the cross section is 17.8% or more and 46.5% or less.

The belt cleaning blade is a cleaning blade that comes into contact with a surface of a belt as a member to be cleaned and is used for cleaning the surface of the belt. By the belt cleaning blade, a toner (such as toner particles or external additives), products of discharge, paper dust, and the like that adhere to or remain on the surface of the belt are removed, and the surface of the belt is cleaned.

Being configured with the aforementioned contact site, the belt cleaning blade according to the present exemplary embodiment has excellent abrasion resistance and excellent chipping resistance. The reason is presumed as follows.

A photoreceptor is an example of a member that is in an image forming apparatus and undergoes surface cleaning with a cleaning blade. In a case where the photoreceptor is cleaned with a cleaning blade, it is possible to remove the deposits on the surface while scraping the surface of the photoreceptor.

Meanwhile, the surface of a belt such as an intermediate transfer belt often has extremely high abrasion resistance. In this case, even being cleaned with a cleaning blade, the surface is unlikely to be scraped off, and the deposits on the surface of the belt remain in many cases. As a result, the belt cleaning blade tends experience abrasion.

Therefore, for the belt cleaning blade, it is desired to increase the hardness of the contact site with a belt, such that the abrasion resistance is improved. However, in a case where the hardness is increased to improve the abrasion resistance, sometimes the contact site with a belt is chipped.

In the belt cleaning blade according to the present exemplary embodiment, first, the contact site with the surface of a belt is configured with polyurethane rubber including a hard segment and a soft segment. Furthermore, in a cross section of the contact site, an abundance ratio of domains of the hard segments (the ratio X described above) and an abundance ratio of domains of the hard segments having a specific area to all domains (the ratio Y described above) are each set to fall into a specific range.

In a case where the above configuration is adopted, the number of domains of the hard segment harder than the soft segment can be increased, which increases the hardness and improves the abrasion resistance. Furthermore, because there is a difference in elongation rate between the domain of the hard segment and the soft segment, sometimes cracks occur at the interface between the segments, which leads to chipping. However, presumably, in a case where the above configuration is adopted, the contact site may include domains of the hard segments that are not too large and have an appropriate size, and the distance between domains of the hard segments will not be too short, which could suppress the occurrence of cracks at the interface between the domains of the hard segments and the soft segments and effectively suppress chipping of the contact site.

Photoreceptor Cleaning Blade

The photoreceptor cleaning blade according to the present exemplary embodiment has a contact site that comes into contact with a surface of a photoreceptor having a surface friction coefficient of 0.85 or more, wherein the contact site is configured with polyurethane rubber including a hard segment and a soft segment, and in a cross section of the contact site, a ratio X of domains of the hard segments to a total area of the cross section is 14.9% or more and 25.1% or less, and a ratio Y of an area of domains of the hard segments having an area of 200 $nm^2$ or more and 1,000 $nm^2$ or less to a total area of the domains of the hard segments in the cross section is 17.8% or more and 46.5% or less.

That is, the photoreceptor cleaning blade according to the present exemplary embodiment is a cleaning blade used for cleaning the surface of the photoreceptor having a surface friction coefficient of 0.85 or more, by coming into contact with the surface of the photoreceptor.

For the reason such as having outermost surface layer not containing a fluororesin or the like, some photoreceptors have a surface friction coefficient of 0.85 or more. In order to clean the surface of such a photoreceptor having a high friction coefficient, a method of using auxiliary facilities applying a lubricant to the surface of the photoreceptor may be used, but this method has a room for improvement in terms of cost, reliability, and the like. As a result of studying a cleaning blade for cleaning the surface of the photoreceptor having a surface friction coefficient of 0.85 or more, a cleaning blade having the above configuration has been found.

In the photoreceptor cleaning blade according to the present exemplary embodiment, first, the contact site with the surface of the photoreceptor is configured with polyurethane rubber including hard segments and soft segments, and an abundance ratio (the ratio X) of domains of the hard segments in a cross section of the contact site and an abundance ratio (the ratio Y) of domains of hard segments having a specific area to all the domains are each set to fall into a specific range.

Setting the ratio X to be equal to or less than the upper limit and setting the ratio Y to be equal to or less than the upper limit suppress the increase in brittleness of the contact site of the photoreceptor cleaning blade. Presumably, as a result, the chipping that occurs due to the pulling of the tip of the contact site (the site in contact with the surface of the photoreceptor) may be suppressed, which may make it possible to obtain a photoreceptor cleaning blade having excellent chipping resistance. In addition, in a case where the rigidity of the contact site of the photoreceptor cleaning blade is reduced, the tip of the contact site (the site in contact with the surface of the photoreceptor) may be seriously pulled in, which prevents the cleaning blade from stably coming into contact with the surface of the photoreceptor and deteriorates cleanliness. Presumably, in a case where the ratio X is set to be equal to or more than the lower limit and the ratio Y is set to be equal to or more than the lower limit in the contact site as in the photoreceptor cleaning blade according to the present exemplary embodiment, the deterioration of rigidity of the contact site of the photoreceptor cleaning blade may be suppressed, and a photoreceptor cleaning blade having excellent cleanliness could be obtained. Furthermore, presumably, using the photoreceptor cleaning blade according to the present exemplary embodiment may make it possible to suppress the occurrence of streak-like image defects resulting from the deterioration of cleanliness.

The belt cleaning blade according to the present exemplary embodiment and the photoreceptor cleaning blade according to the present exemplary embodiment have the same configuration, except for a difference that whether a member to be cleaned (that is, a cleaning object) is a belt or a photoreceptor having a surface friction coefficient is 0.85 or more.

Hereinafter, unless otherwise specified, the sites common to the belt cleaning blade according to the present exemplary embodiment and the photoreceptor cleaning blade according to the present exemplary embodiment will be comprehensively described. Other parts will be separately described as appropriate for the belt cleaning blade according to the present exemplary embodiment and the photoreceptor cleaning blade according to the present exemplary embodiment.

Contact Site of Belt Cleaning Blade or Photoreceptor Cleaning Blade

The contact site of the belt cleaning blade is a contact site with the surface of a belt, and is configured with polyurethane rubber including hard segments and soft segments.

The contact site of the photoreceptor cleaning blade is a contact site with the surface of a photoreceptor, and is configured with polyurethane rubber including hard segments and soft segments.

In a cross section of the contact site, a ratio X of domains of the hard segments to a total area of a cross section of the contact site is 14.9% or more and 25.1% or less, and a ratio Y of an area of domains of the hard segments having an area of 200 $nm^2$ or more and 1,000 $nm^2$ or less to a total area of the domains of the hard segments in the cross section is 17.8% or more and 46.5% or less.

"Domain of the hard segments" refers to an aggregate formed by the aggregation of hard segments of the polyurethane rubber.

Ratio X

In a cross section of the contact site, a ratio X of domains of the hard segments to a total area of the cross section is 14.9% or more and 25.1% or less. The ratio X refers to a ratio of the total area of the domains of the hard segments to the total area of the cross section.

From the viewpoint of improving abrasion resistance of the belt cleaning blade and from the viewpoint of improving cleanliness of the photoreceptor cleaning blade, the ratio X is, for example, preferably 16.0% or more, and more preferably 18.0 or more.

From the viewpoint of improving chipping resistance, the ratio X is, for example, preferably 24.0% or less, and more preferably 23.5% or less.

As described above, from the viewpoint of further improving abrasion resistance and chipping resistance of the belt cleaning blade and from the viewpoint of further improving cleanliness and chipping resistance of the photoreceptor cleaning blade, the ratio X is, for example, preferably 16.0% or more and 24.0% or less, and more preferably 18.0% or more and 23.5% or less.

Ratio Y

In a cross section of the contact site, a ratio Y of an area of domains of the hard segments having an area of 200 $nm^2$ or more and 1,000 $nm^2$ or less to a total area of the domains of the hard segments in the cross section is 17.8% or more and 46.5% or less. The ratio Y refers to a ratio of the total area of domains of the hard segments having an area of 200 $nm^2$ or more and 1,000 $nm^2$ or less to the total area of domains of the hard segments in the cross section.

From the viewpoint of improving chipping resistance, the ratio Y is, for example, preferably 45.0% or less, and more preferably 44.0% or less.

From the viewpoint of improving abrasion resistance of the belt cleaning blade and from the viewpoint of improving cleanliness of the photoreceptor cleaning blade, the ratio Y is, for example, preferably 18.0% or more, and more preferably 19.0% or more.

As described above, from the viewpoint of further improving abrasion resistance and chipping resistance of the belt cleaning blade and from the viewpoint of further improving cleanliness and chipping resistance of the photoreceptor cleaning blade, the ratio Y is, for example, preferably 18.0% or more and 45.0% or less, and more preferably 19.0% or more and 44.0% or less.

As for the combination of the ratio X and the ratio Y, from the viewpoint of further improving abrasion resistance and chipping resistance of the belt cleaning blade and from the viewpoint of further improving cleanliness and chipping resistance of the photoreceptor cleaning blade, for example, it is preferable that the ratio X be 16.0% or more and 24.0% or less and the ratio Y be 17.8% or more and 45.0% or less.

Ratio Z

In a cross section of the contact site, for example, a ratio Z of the number of domains of the hard segments having an area of 200 $nm^2$ or more and 1,000 $nm^2$ or less to the total number of domains of the hard segments in the cross section is preferably 2.2% or more and 11.1% or less. The ratio Z refers to a ratio of the total number of domains of the hard segments having an area of 200 $nm^2$ or more and 1,000 $nm^2$ or less to the total number of domains of the hard segments in the cross section.

From the viewpoint of improving abrasion resistance of the belt cleaning blade and from the viewpoint of improving cleanliness of the photoreceptor cleaning blade, the ratio Z is, for example, more preferably 3.5% or more, and even more preferably 5.0% or more.

From the viewpoint of improving chipping resistance, the ratio Z is, for example, more preferably 10.8% or less, and even more preferably 10.5% or less.

As described above, from the viewpoint of further improving abrasion resistance and chipping resistance of the belt cleaning blade and from the viewpoint of further improving cleanliness and chipping resistance of the photoreceptor cleaning blade, the ratio Z is, for example, more preferably 3.5% or more and 10.8% or less, and even more preferably 5.0% or more and 10.5% or less.

The ratio X, ratio Y, and ratio Z described above are determined by observing a cross section of the contact site with an atomic force microscope (AFM).

Specifically, an arbitrary cross section of the contact site configured with polyurethane rubber is obtained by cryomicrotomy, and from the cross section, 500 nm×500 nm images are obtained in five fields of view by using AFM (AFM5000II manufactured by Hitachi High-Tech Science Corporation). Otsu's binarization is performed on the obtained images by using image processing software, such that the domains of hard segments appear black and the domains of soft segments appear white. From the binarized image, the total area of the cross section, the total area of domains of hard segments, the area of domains of hard segments having an area of 200 $nm^2$ or more and 1,000 $nm^2$ or less, the total number of domains of hard segments, the total number of domains of hard segments having an area of 200 $nm^2$ or more and 1,000 $nm^2$ or less, and diameters of the domains of hard segments are measured.

All of the ratio X, ratio Y, and ratio Z described above are all controlled by adjusting the amount of hard segments and the degree of aggregation of hard segments in the polyurethane rubber. The specific method is not particularly limited, and for example, by controlling the amount of hard segments in a urethane molecule, it is possible to control the total area of the domains of hard segments, the area of the domains of hard segments having an area of 200 $nm^2$ or more and 1,000 $nm^2$ or less, the total number of domains of hard segments, the total number of the domains of hard segments having an area of 200 $nm^2$ or more and 1,000 $nm^2$ or less, and the like.

Next, the configurations of the belt cleaning blade and photoreceptor cleaning blade according to the present exemplary embodiment will be specifically described.

Layer Configuration

Both the belt cleaning blade and photoreceptor cleaning blade according to the present exemplary embodiment may be configured, for example, with a single layer, two layers, or three or more layers, or may have other configurations.

Examples of the cleaning blade configured with a single layer include a cleaning blade configured with a single material as a whole including the contact site coming into contact with a belt or photoreceptor (that is, a cleaning blade consisting of a contact member configured with the aforementioned polyurethane rubber).

Examples of the cleaning blade configured with two layers include a cleaning blade provided with a first layer that consists of a contact member including a contact site coming into contact with a belt or photoreceptor and a second layer (also called a non-contact member) as a back surface layer that is formed on the back surface side of the first layer and consists of a material different from the contact member.

Examples of the cleaning blade configured with three or more layers include a cleaning blade having another layer (this layer is also called a non-contact member) between the first layer and the second layer in the aforementioned cleaning blade configured with two layers.

The cleaning blade is used, for example, by being supported by a rigid plate-shaped support member.

Polyurethane Configuring Contact Site

As described above, the contact site is configured with polyurethane rubber.

The polyurethane rubber can be obtained by polymerizing at least a polyol component and a polyisocyanate component. As necessary, the polyurethane rubber may be obtained by polymerizing a resin having a functional group capable of reacting with an isocyanate group in the polyisocyanate component, in addition to the polyol component.

The polyurethane rubber configuring the contact site includes hard segments and soft segments. In the polyurethane rubber, "hard segment" means a segment that consists of a material relatively harder than a material configuring "soft segment", and "soft segment" means a segment that consists of a material relatively softer than the material configuring "hard segment".

Examples of the material configuring the hard segment (hard segment material) include a low-molecular-weight polyol among polyol components, a resin having a functional group capable of reacting with an isocyanate group in the polyisocyanate component, and the like. On the other hand, examples of the material configuring the soft segment (soft segment material) include a high-molecular-weight polyol among polyol components.

Polyol Component

The polyol component includes a high-molecular-weight polyol and a low-molecular-weight polyol.

The high-molecular-weight polyol is a polyol having a number-average molecular weight of 500 or more (for example, preferably 500 or more and 5,000 or less).

Examples of the high-molecular-weight polyol include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol.

Examples of commercially available products of high-molecular-weight polyols include PLACCEL 205 PLACCEL 240 manufactured by Daicel Corporation, and the like.

The number-average molecular weight is a value measured by gel permeation chromatography (GPC). The same shall apply hereinafter.

One high-molecular-weight polyol may be used alone, or two or more high-molecular-weight polyols may be used in combination.

The polymerization ratio of the high-molecular-weight polyol to all the polymerization components of the polyurethane rubber may be, for example, 30 mol % or more and 50 mol % or less, and is preferably 40 mol % or more and 50 mol % or less.

The low-molecular-weight polyol is a polyol having a molecular weight (or a number-average molecular weight) of less than 500. The low-molecular-weight polyol is also a material that functions as a chain extender and a crosslinking agent.

Examples of the low-molecular-weight polyol include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanedecanediol. Among these, 1,4-butanediol is used as the low-molecular-weight polyol.

Examples of the low-molecular-weight polyol also include polyols such as a diol (difunctional), a triol (trifunctional), and a tetraol (tetrafunctional) which are known as chain extenders and crosslinking agents.

One low-molecular-weight polyol may be used alone, or two or more low-molecular-weight polyols may be used in combination.

The polymerization ratio of the low-molecular-weight polyol to all the polymerization components of the polyurethane rubber may be, for example, more than 50 mol % and 75 mol % or less, preferably 52 mol % or more and 75 mol % or less, more preferably 55 mol % or more and 75 mol % or less, and even more preferably 55 mol % or more and 60 mol % or less.

Polyisocyanate Component Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3-dimethylbiphenyl-4,4'-diisocyanate (TODI).

Among these, as the polyisocyanate component, for example, 4,4'-diphenylmethane diisocyanate (MDI), 1,5-naphthalene diisocyanate (NDI), and hexamethylene diisocyanate (HDI) are more preferable.

One polyisocyanate component may be used alone, or two or more polyisocyanate components may be used in combination.

The polymerization ratio of the polyisocyanate component to all the polymerization components of the polyurethane rubber may be, for example, 5 mol % or more and 25 mol % or less, and preferably 10 mol % or more and 20 mol % or less.

Resin Having Functional Group Capable of Reacting with Isocyanate Group

As the resin having a functional group capable of reacting with an isocyanate group (hereinafter, also called "reactive group-containing resin"), for example, a flexible resin is preferable, and an aliphatic resin having a linear structure is more preferable in view of flexibility. Specific examples of the reactive group-containing resin include an acrylic resin containing two or more hydroxyl groups, a polybutadiene resin containing two or more hydroxyl groups, an epoxy resin having two or more epoxy groups, and the like.

Examples of commercially available products of acrylic resins containing two or more hydroxyl groups include ACTFLOW manufactured by Soken Chemical & Engineering Co., Ltd. (grades: UMB-2005B, UMB-2005P, UMB-2005, UME-2005, and the like).

Examples of commercially available products of the polybutadiene resin containing two or more hydroxyl groups include R-45HT (manufactured by Idemitsu Kosan Co., Ltd.) and the like.

As the epoxy resin having two or more epoxy groups, for example, an epoxy resin is preferable which is not hard and brittle just as the general epoxy resins of the related art and is more flexible and tougher than the epoxy resin of the related art. As such an epoxy resin, for example, in view of molecular structure, an epoxy resin is preferable which has a structure (also called a flexible skeleton) capable of improving mobility of the main chain in the main chain structure of the epoxy resin. Examples of the flexible skeleton include an alkylene skeleton, a cycloalkane skeleton, and a polyoxyalkylene skeleton. Among these, for example, a polyoxyalkylene skeleton is particularly preferable.

In view of physical properties, for example, an epoxy resin is preferable which has a lower viscosity for the molecular weight compared to the epoxy resins of the related art. Specifically, for example, an epoxy resin is preferable which has a weight-average molecular weight in a range of 900±100 and a viscosity at 25° C. in a range of 15,000±5,000 mPa·s, and an epoxy resin is more preferable which has a viscosity at 25° C. in a range of 15,000±3,000 mPa·s. Examples of commercially available products of epoxy resins having such characteristics include EPICLON EXA-4850-150 manufactured by DIC Corporation.

One reactive group-containing resin may be used alone, or two or more reactive group-containing resins may be used in combination.

Manufacturing Method of Polyurethane Rubber

The polyurethane rubber may be manufactured using raw materials for manufacturing polyurethane rubber including the polyol component and polyisocyanate component described above and, as necessary, a resin having a functional group capable of reacting with a reactive isocyanate group, by a general manufacturing method of polyurethane such as a prepolymer method or a one-shot method. With the prepolymer method, polyurethane rubber having excellent abrasion resistance and excellent chipping resistance is obtained. Therefore, this method is suited for the present exemplary embodiment, but the present exemplary embodiment is not limited by the manufacturing method.

For manufacturing the polyurethane rubber, for example, it is preferable to use a catalyst.

Examples of catalysts used for manufacturing the polyurethane rubber include an amine-based compound such as a tertiary amine, a quaternary ammonium salt, and an organometallic compound such as an organotin compound.

Examples of the tertiary amine include a trialkylamine such as triethylamine, a tetraalkyldiamine such as N,N,N',N'-tetramethyl-1,3-butanediamine, an amino alcohol such as dimethylethanolamine, an ester amine such as an ethoxylated amine, an ethoxylated diamine, and bis(diethylethanolamine)adipate, triethylenediamine (TEDA), a cyclohexyl amine derivative such as N,N-dimethylcyclohexylamines, a morpholine derivative such as N-methylmorpholine, N-(2-hydroxypropyl)-dimethylmorpholine, and a piperazine derivative such as N,N'-diethyl-2-methylpiperazine or N,N'-bis-(2-hydroxypropyl)-2-methylpiperazine.

Examples of the quaternary ammonium salt include 2-hydroxypropyltrimethylammonium·octylate, 1,5-diazabicyclo[4.3.0]nonene-5 (DBN)·octylate, 1,8-diazabicyclo[5.4.0]undecene-7 (DBU)-octylate, DBU-oleate, DBU-p-toluenesulfonate, DBU-formate, and 2-hydroxypropyltrimethylammonium·formate.

Examples of the organotin compound include a dialkyltin compound such as dibutyltin dilaurate or dibutyltin di(2-ethylhexanoate), stannous 2-ethylcaproate, and stannous oleate.

Among these catalysts, in view of hydrolysis resistance, triethylenediamine (TEDA), which is a tertiary ammonium salt, is used. Furthermore, in view of processability, for example, a quaternary ammonium salt is used. Among the quaternary ammonium salts, for example, 1,5-diazabicyclo[4.3.0]nonene-5 (DBN)·octylate, 1,8-diazabicyclo[5.4.0]undecene-7 (DBU)-octylate, and DBU-formate, which are highly reactive, are used.

One catalyst may be used alone, or two or more of catalysts may be used in combination.

The content of the catalyst with respect to the total mass of the polyurethane rubber is, for example, preferably in a range of 0.0005% by mass or more and 0.03% by mass or less, and particularly preferably 0.001% by mass or more and 0.01% by mass or less.

Impregnated Cured Layer

It is preferable that the polyurethane rubber configuring the contact site have, as a surface layer, for example, an impregnated cured layer of an isocyanate compound.

The impregnated cured layer enhances the hardness of the contact site, which makes it possible to further improve abrasion resistance and chipping resistance.

The surface layer of the polyurethane rubber configuring the contact site means a region at a depth of 200 μm from the surface of the contact site.

The impregnated cured layer is obtained by modifying the polyurethane rubber configuring the contact site.

Specifically, the impregnated cured layer is a layer obtained by impregnating the surface layer of the contact site configured with the polyurethane rubber with a surface treatment liquid containing an isocyanate compound and an organic solvent, and curing the surface treatment liquid (that is, the isocyanate compound) with which the surface layer is impregnated.

The impregnated cured layer is formed as a layer integrated with the surface layer of the contact site such that the density of the layer gradually decreases toward the inside from the surface.

Examples of the isocyanate compound include 2,6-tolylene diisocyanate (TDI), 4,4'-diphenylmethane diisocyanate (MDI), paraphenylenediisocyanate (PPDI), 1,5-naphthalene diisocyanate (NDI), 3,3'-dimethyldiphenyl-4,4'-diisocyanate (TODI), and multimers and modification products of these.

The surface layer of the polyurethane rubber configuring the contact site may have a layer impregnated with diamond-like carbon. Furthermore, a diamond-like carbon layer may be provided on the surface of the polyurethane rubber configuring the contact site.

Physical Properties of Contact Site

From the viewpoint of excellent abrasion resistance and excellent chipping resistance, the Young's modulus of the polyurethane rubber configuring the contact site is, for example, preferably 3 MPa or more and 25 MPa or less, more preferably 5 MPa or more and 22 MPa or less, and even more preferably 10 MPa or more and 20 MPa or less.

The Young's modulus is measured as follows.

The Young's modulus is measured using a nanoindentation method. Specifically, by using PICODENTOR HM500 manufactured by Fischer Instrumentation and a Berkovich diamond indenter, an indentation depth-loading curve is drawn. Then, an unloading curve is drawn by applying load so that the maximum indentation depth reaches 1,000 nm and then removing the load, and the slope of the unloading curve is calculated as the Young's modulus.

From the viewpoint of excellent abrasion resistance and excellent chipping resistance, the hardness of the polyurethane rubber configuring the contact site is, for example, preferably 60 or more and 98 or less, more preferably 65 or more and 97 or less, and even more preferably 70 or more and 95 or less.

The aforementioned hardness is micro rubber hardness. The micro rubber hardness is measured based on the micro hardness MD-1 test method by using a micro rubber hardness tester MD-1 type (polymer A type).

Molding of Contact Member

The contact site (that is, the aforementioned contact member) configured with the polyurethane rubber is prepared by molding a composition for molding a cleaning blade containing the polyurethane rubber or prepolymer obtained by the method described above in the form of a sheet by using, for example, centrifugal molding, extrusion molding, or the like, and processing the molded resultant by cutting or the like.

The contact site is obtained by molding the composition for molding a cleaning blade. Therefore, the contact site may be configured with the polyurethane rubber as a main component as well as additives used for obtaining the polyurethane rubber, a filler used as necessary, and the like.

Manufacturing of Cleaning Blade

The cleaning blade configured with a single layer is manufactured, for example, by the contact member molding method described above.

The cleaning blade configured with two layers and the cleaning blade configured with three or more layers are prepared, for example, by bonding a first layer as a contact member and a second layer as a non-contact member (a plurality of layers in a case where the cleaning blade is configured with three or more layers) to each other. As the bonding method, double-sided tape, various adhesives, and the like are used. Furthermore, during molding, materials of the respective layers may be poured into a mold with variations in time and allowed to be bonded to each other without providing an adhesive layer, such that a plurality of layers stick together.

Composition of Non-Contact Member

What will be described below is the composition of a non-contact member of a cleaning blade that has a contact member and a non-contact member, such as the aforementioned second layer and other layers, configured with different materials.

Any of known materials can be used for the non-contact member without limitations, as long as the non-contact member has a function of supporting the contact member. Specifically, examples of the material used for the non-contact member include polyurethane rubber, silicon rubber, fluororubber, chloroprene rubber, butadiene rubber, and the like. Among these, for example, polyurethane rubber may be used. Examples of the polyurethane rubber include ester-based polyurethane and ether-based polyurethane. Among these, for example, ester-based polyurethane is particularly preferable.

Condition of Contact with Belt

By coming into contact with the surface of a belt which is a member to be cleaned, the belt cleaning blade according to the present exemplary embodiment cleans the surface of the belt.

The condition of the contact between the belt and the belt cleaning blade will be described using FIG. 1.

FIG. 1 is a schematic view illustrating a condition of contact between a belt and the belt cleaning blade. In FIG. 1, BE represents an intermediate transfer belt (an example of a belt), CB represents the belt cleaning blade, and CBS represents the support member that supports the cleaning blade.

From the viewpoint of obtaining excellent cleanliness, a pressing force NF shown in FIG. 1 that is for pressing the belt cleaning blade CB on the belt BE is, for example, preferably 0.05 N·m or more and 5 N·m or less, and more preferably 0.1 N·m or more and 3 N·m or less.

The intrusion d of the belt cleaning blade CB into the belt BE is, for example, preferably 0 mm or more and 10 mm or less, and more preferably 0.01 mm or more and 5 mm or less.

An angle WA (working angle) at the contact portion between the belt BE and the belt cleaning blade CB is, for example, preferably 3° or more and 35° or less, and more preferably 5° or more and 30° or less.

The pressing force NF of the cleaning blade is calculated by the following formula.

Formula: Pressing force $NF=k\times d$

In the formula, k represents a spring constant unique to the cleaning blade, and d represents an intrusion of the cleaning blade into the belt (see FIG. 1).

The spring constant k unique to the cleaning blade is obtained by causing displacement of the cleaning blade and measuring the load with a load cell.

The intrusion d of the cleaning blade into the belt is determined by calculating the amount of displacement of the blade caused in a case where the cleaning blade fixed to the support member is brought into contact with the belt.

Member to be Cleaned

Examples of the belt as a member to be cleaned by the belt cleaning blade according to the present exemplary embodiment include an intermediate transfer belt, a secondary transfer belt, a paper transport belt, and the like used in an image forming apparatus. Among these, from the viewpoint of obtaining excellent cleanliness by combining with the belt cleaning blade according to the present exemplary embodiment, for example, an intermediate transfer belt is preferable as a member to be cleaned.

Intermediate Transfer Belt

Hereinafter, for example, a secondary transfer belt suited as a member to be cleaned will be described.

Layer Configuration

Examples of the intermediate transfer belt include a single layer of a polyimide-based resin layer or a laminate having a polyimide-based resin layer as the outermost surface layer.

That is, for example, the outer peripheral surface of the intermediate transfer belt may be configured with a polyimide-based resin layer.

In a case where the intermediate transfer belt is configured with a laminate having a polyimide-based resin layer as the outermost surface layer, the intermediate transfer belt in which the polyimide-based resin layer is provided on a resin substrate layer is adopted. An interlayer (such as an elastic layer) may be provided between the substrate layer and the polyimide-based resin layer.

As the resin substrate layer and the interlayer (such as an elastic layer), known layers adopted for intermediate transfer belts are used.

Configuration of Polyimide-Based Resin Layer

The polyimide-based resin layer contains, for example, a polyimide-based resin and conductive carbon particles. The polyimide-based resin layer preferably contains, for example, a release agent.

As necessary, the polyimide-based resin layer may contain other known components.

The polyimide-based resin layer is a layer containing a polyimide-based resin as a component having the greatest mass among the components configuring the resin layer.

Polyimide-Based Resin

The polyimide-based resin means a resin containing a constitutional unit having an imide bond.

Examples of the polyimide-based resin include a polyimide resin, a polyamide-imide resin, and a polyetherimide resin.

From the viewpoint of cleanliness maintainability, as the polyimide-based resin, among the above, for example, a polyimide resin and a polyamide-imide resin are preferable, and a polyimide resin is more preferable.

Examples of the polyimide resin include an imidized polyamic acid (polyimide resin precursor) which is a polymer of a tetracarboxylic acid dianhydride and a diamine compound.

Examples of the polyimide resin include a resin having a constitutional unit represented by General Formula (I).

General Formula (I)

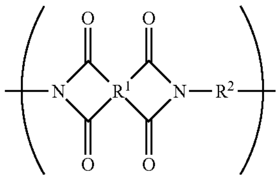

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic acid dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these. Specific examples of the divalent organic group include a residue of a diamine compound which will be described later.

Specifically, examples of the tetracarboxylic acid dianhydride used as a raw material of the polyimide resin include a pyromellitic acid dianhydride, a 3,3',4,4'-benzophenone tetracarboxylic acid dianhydride, a 3,3',4,4'-biphenyltetracarboxylic acid dianhydride, a 2,3,3',4-biphenyltetracarboxylic acid dianhydride, a 2,3,6,7-naphthalenetetracarboxylic acid dianhydride, a 1,2,5,6-naphthalenetetracarboxylic acid dianhydride, a 1,4,5,8-naphthalenetetracarboxylic acid dianhydride, a 2,2'-bis(3,4-dicarboxyphenyl)sulfonic acid dianhydride, a perylene-3,4,9,10-Tetracarboxylic acid dianhydride, a bis(3,4-dicarboxyphenyl)ether dianhydride, and an ethylenetetracarboxylic acid dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl)toluene, bis(p-β-amino-tert-butylphenyl)ether, bis(p-β-methyl-δ-aminophenyl)benzene, bis-p-(1,1-dimethyl-5-amino-pentyl) benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

Examples of the polyamide-imide resin include a resin having an imide bond and an amide bond in a repeating unit.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof preferable. In addition to the tricarboxylic acid, a tetracarboxylic acid dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

From the viewpoint of mechanical strength, volume resistivity adjustment, and the like, the content of the polyimide-based resin with respect to the polyimide-based resin layer is, for example, preferably 60% by mass or more and 95% by mass or less, more preferably 70% by mass or more and 95% by mass or less, and even more preferably 75% by mass or more and 90% by mass or less.

Conductive Carbon Particles

Examples of the conductive carbon particles include carbon black.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

From the viewpoint of dispersibility, mechanical strength, volume resistivity, film forming properties, and the like, the average particle size of the conductive carbon particles is, for example, preferably 2 nm or more and 40 nm or less, more preferably 8 nm or more and 20 nm or less, and even more preferably 10 nm or more and 15 nm or less.

The average particle size of the conductive carbon particles is measured by the following method.

First, by a microtome, a measurement sample having a thickness of 100 nm is collected from the polyimide-based resin layer and observed with a transmission electron microscope (TEM). Then, the diameters of circles each having an area equivalent to the projected area of each of 50 conductive carbon particles (that is, equivalent circle diameters) are adopted as particle sizes, and the average thereof are adopted as the average particle size.

From the viewpoint of mechanical strength and volume resistivity, the content of the conductive carbon particles is, for example, preferably 10% by mass or more and 50% by mass or less with respect to the polyimide-based resin layer.

Other Components

Examples of other components include a conducting agent other than conductive carbon particles, a filler for improving mechanical strength, an antioxidant for preventing thermal deterioration of a belt, a surfactant for improving fluidity, a heat-resistant antioxidant, and a release agent.

In a case where the polyimide-based resin layer contains other components, the content of the other components with respect to the polyimide-based resin layer is, for example, preferably more than 0% by mass and 10% by mass or less, more preferably more than 0% by mass and 5% by mass or less, and even more preferably more than 0% by mass and 1% by mass or less.

Thickness of Polyimide-Based Resin Layer

In a case where the intermediate transfer belt is configured with a single polyimide-based resin layer, from the viewpoint of mechanical strength, the thickness of the polyimide-based resin layer is, for example, preferably 60 μm or more and 120 μm or less, and more preferably 80 μm or more and 120 μm or less.

In a case where the intermediate transfer belt is configured with a laminate having the polyimide-based resin layer as the outermost surface layer, from the viewpoint of manufacturing suitability and from the viewpoint of suppressing discharge, the thickness of the polyimide-based resin layer is, for example, preferably 1 μm or more and 60 μm or less, and more preferably 3 μm or more and 60 μm or less.

The thickness of the polyimide-based resin layer is measured as follows.

That is, a cross section of the polyimide-based resin layer taken along the thickness direction is observed with an optical microscope or a scanning electron microscope, the thickness of the layer as a measurement target is measured at 10 sites, and the average thereof is adopted as the thickness.

Surface Roughness of Outer Peripheral Surface of Intermediate Transfer Belt

From the viewpoint of improving cleanliness of the belt cleaning blade according to the present exemplary embodiment, a surface roughness Rz of the outer peripheral surface of the intermediate transfer belt is, for example, preferably 0.001 μm or more and 1 μm or less, more preferably 0.005 μm or more and 0.5 μm or less, and even more preferably 0.01 μm or more and 0.3 μm or less.

The surface roughness Rz of the outer peripheral surface of the intermediate transfer belt is a ten-point mean roughness Rz measured according to JIS B 0601: 1994. The surface roughness Rz is measured in an environment at 23° C. and 55% RH by using a contact-type surface roughness measuring device (SURFCOM 570A, manufactured by TOKYO SEIMITSU CO., LTD.). As a touch probe, a touch probe tipped with diamond (5 μmR, 90° cone) is used. The measurement conditions are: touch probe=touch probe tipped with diamond (5 μmR, 90° cone), measurement distance=2.5 mm, cutoff wavelength=0.8 mm, measurement speed=0.60 mm/s.

The measurement site is in the central portion of the outer peripheral surface of the intermediate transfer belt in the width direction. The surface roughness Rz is measured at 3 sites, and the average thereof is calculated.

Volume Resistivity of Intermediate Transfer Belt

From the viewpoint of transferability, the common logarithm of the volume resistivity that the intermediate transfer belt has in a case where a voltage of 500 V is applied thereto for 10 seconds is, for example, preferably 9.0 (log Ω·cm) or more and 13.5 (log Ω·cm) or less, more preferably 9.5 (log Ω·cm) or more and 13.2 (log Ω·cm) or less, and particularly preferably 10.0 (log Ω·cm) or more and 12.5 (log Ω·cm) or less.

The volume resistivity that the intermediate transfer belt has in a case where a voltage of 500 V is applied thereto for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the volume resistivity (log Ω·cm) is measured at a total of 18 spots in the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Surface Resistivity of Intermediate Transfer Belt From the viewpoint of transferability to embossed paper, the common logarithm of the surface resistivity that the intermediate transfer belt has in a case where a voltage of 500 V is applied to the outer peripheral surface thereof for 10 seconds is, for example, preferably 10.0 (log Ω/suq.) or more 15.0 (log Ω/suq.) or less, more preferably 10.5 (log Ω/suq.) or more and 14.0 (log Ω/suq.) or less, and particularly preferably 11.0 (log Ω/suq.) or more and 13.5 (log Ω/suq.) or less.

The unit of the surface resistivity, log Ω/suq, expresses the surface resistivity in a logarithm of resistance per unit area, which is also written as log(Ω/suq.), log Ω/suquare, log Ω/□, or the like.

The surface resistivity that the intermediate transfer belt has in a case where a voltage of 500 V is applied to the outer peripheral surface thereof for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/suq.) of the outer peripheral surface of the intermediate transfer belt is measured at a total of 18 spots within the outer peripheral surface of the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Condition of Contact with Photoreceptor

By coming into contact with the surface of a photoreceptor which is a member to be cleaned, the photoreceptor cleaning blade according to the present exemplary embodiment cleans the surface of the photoreceptor.

The condition of the contact between the photoreceptor and the photoreceptor cleaning blade will be described using FIG. 1, just as the belt cleaning blade. In FIG. 1, BE is read as a photoreceptor, CB is read as the photoreceptor cleaning blade, and CBS represents the support member that supports the cleaning blade.

From the viewpoint of obtaining excellent cleanliness, a pressing force NF shown in FIG. 1 that is for pressing the photoreceptor cleaning blade CB on the photoreceptor BE is, for example, preferably 0.4 N·m or more and 3.0 N·m or less, and more preferably 0.8 N·m or more and 2.5 N·m or less.

The intrusion d of the photoreceptor cleaning blade CB into the photoreceptor BE is, for example, preferably 0.3 mm or more and 2 mm or less, and more preferably 0.6 mm or more and 1.4 mm or less.

An angle WA (working angle) at the contact portion between the photoreceptor BE and the photoreceptor cleaning blade CB is, for example, preferably 5° or more and 30° or less, and more preferably 8° or more and 24° or less.

Photoreceptor (Member to Be Cleaned)

The photoreceptor which is a member to be cleaned by the photoreceptor cleaning blade according to the present exemplary embodiment is not particularly limited, as long as the photoreceptor has a surface friction coefficient of 0.85 or more.

The surface friction coefficient of the photoreceptor is measured as follows.

On the surface of the photoreceptor, coefficients of friction is continuously measured 30 times by a HEIDON resistance measurement method under the following measurement conditions, and the average of the 10th to 20th coefficients measured is calculated. As the friction coefficient, a coefficient of dynamic friction of a needle is measured. The friction coefficient is measured using TRIBOGEAR (variable normal load friction and wear measurement system) and TYPEHHS2000 (using standard analysis software) manufactured by Shinto Scientific Co., Ltd. are used.

Measurement Condition

Needle material: diamond, needle tip shape: R=0.2 mm, normal load: 20 g, contact angle of needle: 90° (in a direction perpendicular to the surface of a photoreceptor), movement distance of needle: 10 mm one-way with reciprocating, number of times of reciprocating: 30

Examples of the photoreceptor having a surface friction coefficient of 0.85 or more include a photoreceptor having a conductive substrate and a photosensitive layer provided on the conductive substrate. Because the outermost surface layer is the photosensitive layer, the surface friction coefficient tends to be high.

The photoreceptor having a surface friction coefficient of 0.85 or more may be a photoreceptor that has a conductive substrate and a photosensitive layer provided on the conductive substrate, in which the outermost surface layer does not contain a fluororesin or contains a small amount of fluororesin. The outermost surface layer containing a fluororesin has a low surface friction coefficient. Therefore, the lower the content of the fluororesin, the higher the coefficient of friction of the surface (that is, the surface of the photoreceptor) of the outermost surface layer.

The photosensitive layer in the photoreceptor may be either a laminate-type photosensitive layer configured with a charge generation layer and a charge transport layer laminated together or a single layer-type photosensitive layer. Examples of the layer to be the outermost surface layer include a charge transport layer, a single layer-type photosensitive layer, and a surface protective layer.

An undercoat layer may be provided between the conductive substrate and the photosensitive layer. An interlayer may be additionally provided between the undercoat layer and the photosensitive layer.

Hereinafter, each layer will be specifically described.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Furthermore, examples of the conductive substrate also include paper, a resin film, a belt, and the like that are coated with a conductive compound (such as a conductive polymer or indium oxide), a metal (such as aluminum, palladium, or gold), or an alloy, or have undergone vapor deposition or lamination of these materials.

As the conductive substrate, a known conductive substrate may be used.

Undercoat Layer

Examples of the undercoat layer include a layer containing inorganic particles and a binder resin.

Examples of the inorganic particles include inorganic particles having a powder resistance (volume resistivity) of $10^2$ Ωcm or more and $10^{11}$ Ωcm or less.

Among these, as the inorganic particles having the above resistivity, for example, metal oxide particles such as tin oxide particles, titanium oxide particles, zinc oxide particles, and zirconium oxide particles may be used, and zinc oxide particles are particularly preferable.

The inorganic particles may have undergone a surface treatment. Two or more kinds of inorganic particles that have undergone different surface treatments or have different particle sizes may be used by being mixed together.

Examples of the surface treatment agent include a silane coupling agent, a titanate-based coupling agent, an aluminum-based coupling agent, a surfactant, and the like. Particularly, for example, a silane coupling agent is preferable, and a silane coupling agent containing an amino group is more preferable.

From the viewpoint of improving long-term stability of electrical characteristics and carrier blocking properties, for example, it is preferable that the undercoat layer contain inorganic particles and an electron-accepting compound (acceptor compound).

As the electron-accepting compound, for example, a compound having an anthraquinone structure is preferable. As the compound having an anthraquinone structure, for example, a hydroxyanthraquinone compound, an aminoanthraquinone compound, an aminohydroxyanthraquinone compound, and the like are preferable. Specifically, for example, anthraquinone, alizarin, quinizarin, anthrarufin, purpurin, 1,2-dihydroxy-4-ethoxyanthraquinone, or the like is preferable.

The electron-accepting compound may be contained in the undercoat layer in a state of being dispersed with inorganic particles or in a state of being attached to the surface of the inorganic particles.

The content of the electron-accepting compound with respect to the inorganic particles may be 0.01% by mass or more and 20% by mass or less, and is, for example, preferably 0.01% by mass or more and 10% by mass or less.

As the binder resin used for the undercoat layer, for example, a resin insoluble in the coating solvent of the upper layer is preferable. Particularly, a resin is preferable which is obtained by a reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin.

In a case where two or more of these binder resins are used in combination, the mixing ratio is set as necessary.

In order to improve electrical characteristics, environmental stability, and image quality, the undercoat layer may contain various additives.

Examples of the additives include known materials such as an electron transporting pigment including a polycyclic condensed electron transporting pigment or an azo-based electron transporting pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

The film thickness of the undercoat layer is, for example, preferably set to fall into a range of 15 μm or more, and more preferably set to fall into a range of 20 μm or more and 50 μm or less.

Interlayer

The interlayer is, for example, a layer containing a resin. Examples of the resin used for the interlayer include polymer compounds such as an acetal resin (for example, polyvinyl butyral or the like), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, and a melamine resin.

The interlayer may be a layer containing an organometallic compound. Examples of the organometallic compound used for the interlayer include organometallic compounds containing metal atoms such as zirconium, titanium, aluminum, manganese, and silicon.

The compounds used for the interlayer may be used alone, or used in the form of a mixture or a polycondensate of a plurality of compounds.

Among these, for example, a layer containing an organometallic compound containing zirconium atoms or silicon atoms is preferable as the interlayer.

The film thickness of the interlayer is, for example, preferably set to fall into a range of 0.1 μm or more and 3 μm or less. Furthermore, the interlayer may be used as an undercoat layer.

Charge Generation Layer

The charge generation layer is, for example, a layer containing a charge generation material and a binder resin. Furthermore, the charge generation layer may be a deposition layer of a charge generation material. The deposition layer of a charge generation material is, for example, preferable in a case where an incoherent light source such as a light emitting diode (LED) or an organic electro-luminescence (EL) image array is used.

Examples of the charge generation material include an azo pigment such as bisazo or trisazo; a condensed aromatic ring pigment such as dibromoanthanthrone; a perylene pigment; a pyrrolopyrrole pigment; a phthalocyanine pigment; zinc oxide; trigonal selenium, and the like.

The binder resin used for the charge generation layer is selected from a wide variety of insulating resins. Furthermore, the binder resin may be selected from organic photoconductive polymers such as poly-N-vinylcarbazole, polyvinylanthracene, polyvinylpyrene, and polysilane.

The blending ratio between the charge generation material and the binder resin is, for example, preferably in a range of 10:1 to 1:10 in terms of mass ratio.

The charge generation layer may also contain other known additives.

The film thickness of the charge generation layer is, for example, preferably set to fall into a range of 0.1 μm or more and 5.0 μm or less, and more preferably set to fall into a range of 0.2 μm or more and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material also include hole transporting compounds such as a triarylamine-based compound, a benzidine-based compound, an arylalkane-based compound, an aryl-substituted ethylene-based compound, a stilbene-based compound, an anthracene-based compound, and a hydrazone-based compound. One of these charge transport materials used alone, or two or more of these charge transport materials may be used, but the charge transport materials are not limited thereto.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, polysilane, and the like. Among these, for example, a polycarbonate resin or a polyarylate resin is preferable as the binder resin. One of these binder resins is used alone, or two or more of these binder resins may be used.

The blending ratio between the charge transport material and the binder resin is, for example, preferably in a range of 10:1 to 1:5 in terms of mass ratio.

The charge transport layer may also contain other known additives.

The film thickness of the charge transport layer is, for example, preferably set to fall into a range of 5 μm or more and 50 μm or less, and more preferably set to fall into a range of 10 μm or more and 30 μm or less.

Single Layer-Type Photosensitive Layer

The single layer-type photosensitive layer (charge generation/charge transport layer) is, for example, a layer containing a charge generation material, a charge transport material, and, as necessary, a binder resin plus other known additives. These materials are the same as the materials described above for the charge generation layer and the charge transport layer.

In the single layer-type photosensitive layer, the content of the charge generation material with respect to the total solid content may be, for example, 0.1% by mass or more and 10% by mass or less, and is, for example, preferably 0.8% by mass or more and 5% by mass or less. Furthermore, in the single layer-type photosensitive layer, the content of the charge transport material may be, for example, 5% by mass or more and 50% by mass or less with respect to the total solid content.

The method of forming the single layer-type photosensitive layer is the same as the method of forming the charge generation layer or the charge transport layer.

The film thickness of the single layer-type photosensitive layer may be 5 μm or more and 50 μm or less, and is, for example, preferably 10 μm or more and 40 μm or less.

Image Forming Apparatus

The image forming apparatus according to the present exemplary embodiment includes a photoreceptor, a charging device that charges the photoreceptor, an electrostatic latent image forming device that forms an electrostatic latent image on a surface of the charged photoreceptor, a developing device that develops the electrostatic latent image formed on the surface of the photoreceptor with a toner to form a toner image, a transfer device that transfers the toner image formed on the photoreceptor to a surface of a recording medium, a belt that is a member to be cleaned, and a belt cleaning blade that brings the aforementioned contact site into contact with a surface of the belt to clean the surface.

As described above, examples of the belt as the member to be cleaned include an intermediate transfer belt, a secondary transfer belt, a paper transport belt, and the like. Furthermore, as the belt cleaning blade, the belt cleaning blade according to the present exemplary embodiment is used.

The image forming apparatus according to the present exemplary embodiment includes a photoreceptor that has a surface friction coefficient of 0.85 or more, a charging device that charges the photoreceptor, an electrostatic latent image forming device that forms an electrostatic latent image on a surface of the charged photoreceptor, a developing device that develops the electrostatic latent image formed on the surface of the photoreceptor with a toner to form a toner image, a transfer device that transfers the toner image formed on the photoreceptor to a surface of a recording medium, and a photoreceptor cleaning blade that brings the aforementioned contact site into contact with a surface of the photoreceptor on which the toner image has been transferred by the transfer device to clean the surface.

Examples of the photoreceptor having a surface friction coefficient of 0.85 or more include the photoreceptor as a member to be cleaned described above. Furthermore, as the photoreceptor cleaning blade, the photoreceptor cleaning blade according to the present exemplary embodiment is used.

The image forming apparatus according to the present exemplary embodiment may include both the belt cleaning blade according to the present exemplary embodiment and the photoreceptor cleaning blade according to the present exemplary embodiment. Specifically, the image forming apparatus according to the present exemplary embodiment may include a photoreceptor that has a surface friction coefficient of 0.85 or more, a charging device that charges the photoreceptor, an electrostatic latent image forming device that forms an electrostatic latent image on a surface of the charged photoreceptor, a developing device that develops the electrostatic latent image formed on the surface of the photoreceptor with a toner to form a toner image, a transfer device that transfers the toner image formed on the photoreceptor to a surface of a recording medium, a photoreceptor cleaning blade that brings the aforementioned contact site into contact with a surface of the photoreceptor on which the toner image has been transferred by the transfer device to clean the surface, a belt that is a member to be cleaned, and a belt cleaning blade that brings the aforementioned contact site into contact with a surface of the belt to clean the surface.

As the image forming apparatus according to the present exemplary embodiment, known image forming apparatuses are used which include an apparatus including a fixing means that fixes a toner image transferred to a surface of a recording medium; an apparatus including a cleaning device that cleans a surface of a photoreceptor not yet being charged after transfer of a toner image; an apparatus including an electricity removing device that removes electricity by irradiating a surface of a photoreceptor, the photoreceptor not yet being charged, with electricity removing light after transfer of a toner image; an apparatus including a photoreceptor heating member that raises the temperature of a photoreceptor to reduce relative temperature, and the like.

Furthermore, as the image forming apparatus according to the present exemplary embodiment, a direct transfer-type apparatus that transfers a toner image formed on a surface of a photoreceptor directly to a recording medium; and an intermediate transfer-type apparatus that performs primary transfer of a toner image formed on a surface of a photoreceptor to a surface of an intermediate transfer belt and performs secondary transfer of the toner image transferred to the surface of the intermediate transfer belt to a surface of a recording medium are also used.

In the case of the intermediate transfer-type apparatus, the transfer device is configured with, for example, an intermediate transfer belt that has a surface to which a toner image is to be transferred, a primary transfer device that performs primary transfer of the toner image formed on a surface of a photoreceptor to a surface of the intermediate transfer belt, and a secondary transfer device that performs secondary transfer of the toner image transferred to the surface of the intermediate transfer belt to a surface of a recording medium.

The image forming apparatus according to the present exemplary embodiment may be either an image forming apparatus for a dry developing method or an image forming apparatus for a wet developing method (developing method using a liquid developer).

In the image forming apparatus according to the present exemplary embodiment, for example, a portion including the photoreceptor may be a cartridge structure (process cartridge) detachable from the image forming apparatus.

Hereinafter, an example of the image forming apparatus according to the present exemplary embodiment will be described with reference to drawings. Here, the image forming apparatus according to the present exemplary embodiment is not limited thereto. Hereinafter, among the parts shown in the drawing, main parts will be described, and others will not be described.

Figure 2:
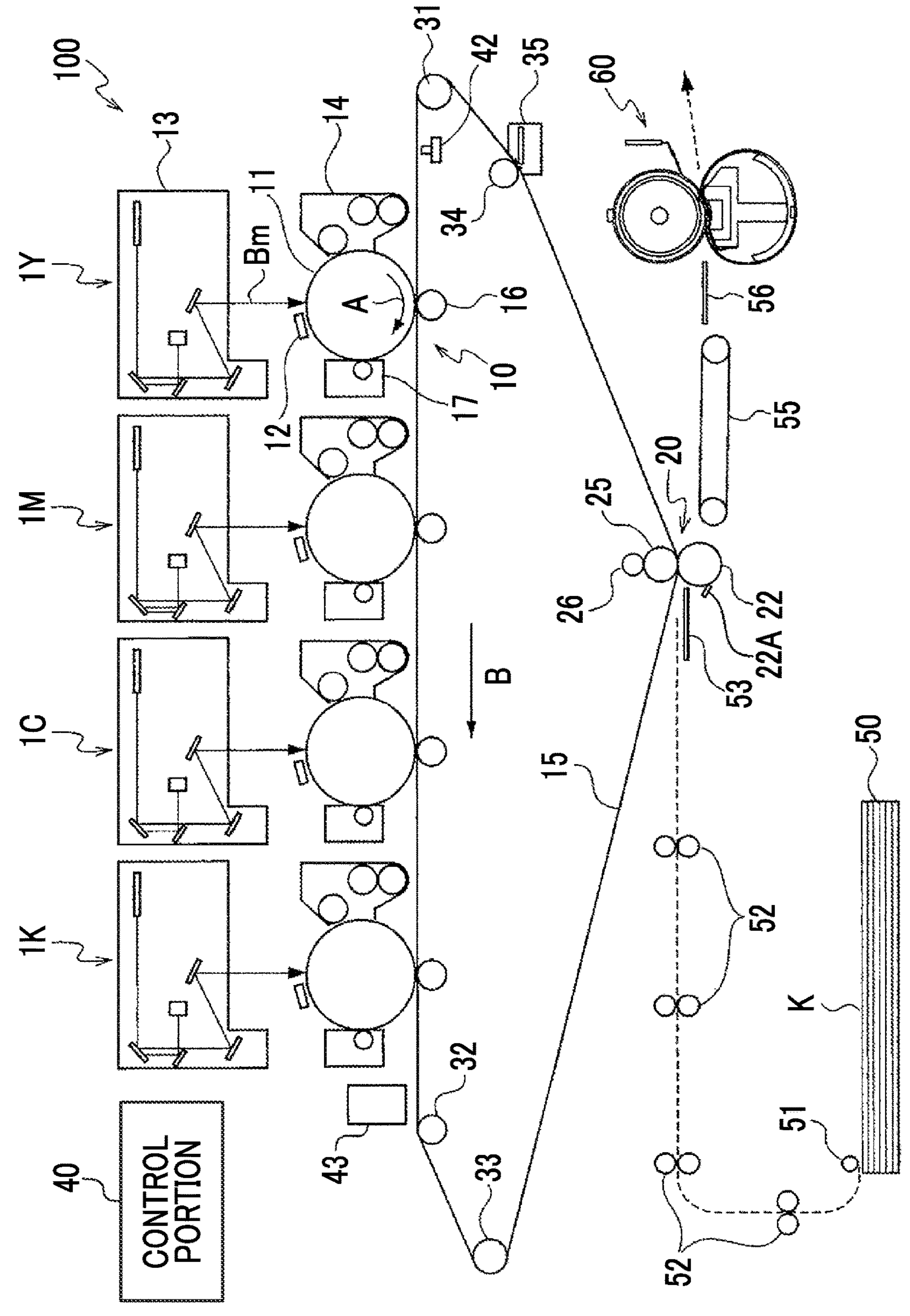
FIG. 2 is a schematic configuration view showing an example of an image forming apparatus according to the present exemplary embodiment.

FIG. 2 is a schematic configuration view showing the configuration of the image forming apparatus according to the present exemplary embodiment.

As shown in FIG. 2, an image forming apparatus 100 according to the present exemplary embodiment is, for example, an intermediate transfer-type image forming apparatus that is generally called a tandem type, and includes a plurality of image forming units 1Y, 1M, 1C, and 1K (an example of a toner image forming device) in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control portion 40 that controls the operation of each device (each portion).

Each of the image forming units 1Y, 1M, 1C, and 1K of the image forming apparatus 100 includes a photoreceptor 11 that holds the toner image formed on the surface thereof and rotates in the direction of an arrow A.

Around the photoreceptor 11, there are provided a charger 12 for charging the photoreceptor 11 as an example of a charging device and a laser exposure machine 13 for drawing an electrostatic latent image on the photoreceptor 11 as an example of an electrostatic latent image forming device (in FIG. 2, the exposure beam is represented by a mark Bm).

Around the photoreceptor 11, as an example of a developing device, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

By various rolls, the intermediate transfer belt 15 is driven to circulate (rotate) in a direction B shown in FIG. 2 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a supporting roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided to face a secondary transfer belt-cleaning blade 35 scrapping off the residual toner or the like on the intermediate transfer belt 15.

As the secondary transfer belt-cleaning blade 35, the belt cleaning blade according to the present exemplary embodiment is used. At this time, the intermediate transfer belt 15 corresponds to a belt that is a member to be cleaned.

The primary transfer portion 10 is configured with the primary transfer roll 16 that is arranged to face the photoreceptor 11 across the intermediate transfer belt 15. The primary transfer roll 16 is arranged to be pressed on the photoreceptor 11 across the intermediate transfer belt 15, and the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 includes the back roll 25 and a secondary transfer roll 22 that is arranged on a toner image-holding surface side of the intermediate transfer belt 15.

The back roll 25 is formed such that the surface resistivity thereof is $1\times10^{7}\Omega/\square$ or more and $1\times10^{10}\Omega/\square$ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

On the other hand, the secondary transfer roll 22 is a cylindrical roll having a volume resistivity of $10^{7.5}$ Ωcm or more and $10^{8.5}$ Ωcm or less. The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, the secondary transfer belt-cleaning blade 35 separable from the intermediate transfer belt 15 is provided which removes the residual toner or paper powder on the intermediate transfer belt 15 remaining after the secondary transfer and cleans the outer peripheral surface of the intermediate transfer belt 15.

On the downstream side of the secondary transfer portion 20 of the secondary transfer roll 22, a secondary transfer roll-cleaning member 22A is provided which removes the residual toner or paper powder on the secondary transfer roll 22 remaining after the secondary transfer and cleans the outer peripheral surface of the intermediate transfer belt 15. Examples of the secondary transfer roll-cleaning member 22A include a cleaning blade. The secondary transfer roll-cleaning member 22A may be a cleaning roll.

The image forming apparatus 100 may have a configuration in which the apparatus includes a secondary transfer belt (an example of a secondary transfer member) instead of the secondary transfer roll 22.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. On the downstream side of the black image forming unit 1K, an image density sensor 43 for adjusting image quality is arranged. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal.

The image forming apparatus according to the present exemplary embodiment includes, as a transport means for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

In a case where the photoreceptor 11 is a photoreceptor having a surface friction coefficient of 0.85 or more, the photoreceptor cleaner 17 is, for example, preferably a cleaning device that includes the photoreceptor cleaning blade according to the present exemplary embodiment (not shown in the drawing) cleaning the surface of the photoreceptor 11.

Hereinafter, as an example of the photoreceptor cleaner 17, a cleaning device including the photoreceptor cleaning blade according to the present exemplary embodiment (the cleaning device according to the present exemplary embodiment) will be described.

The cleaning device according to the present exemplary embodiment is not particularly limited, as long as the cleaning device includes the photoreceptor cleaning blade according to the present exemplary embodiment as a cleaning blade that comes into contact with a surface of a photoreceptor to clean the surface of the photoreceptor. For example, the cleaning device has a configuration including a transport member which fixes a photoreceptor cleaning blade in a cleaning case having an opening portion on the photoreceptor side such that the tip of the contact site is the opening portion side and guides a removed substance, such as a waste toner, collected from the surface of the photoreceptor to a removed substance collecting container, and the like. In addition, two or more photoreceptor cleaning blades according to the present exemplary embodiment may be used in the cleaning device.

Next, by using the image forming apparatus shown in FIG. 2, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the substrate of the intermediate transfer belt 15, and the toner images are sequentially overlapped on the outer peripheral surface of the intermediate transfer belt 15 and subjected to primary transfer.

After the primary transfer by which the toner images are sequentially transferred to the outer peripheral surface of the intermediate transfer belt 15, the intermediate transfer belt 15 moves, and the toner images are transported to the secondary transfer portion 20. In a case where the toner images are transported to the secondary transfer portion 20, in the transport means, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, such that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an ejection portion of the image forming apparatus.

After the transfer to the paper K is finished, the residual toner remaining on the intermediate transfer belt 15 is transported to the secondary transfer belt-cleaning blade 35 as the intermediate transfer belt 15 rotates, and is removed from the intermediate transfer belt 15 by the secondary transfer belt-cleaning blade 35.

Transfer Device

The transfer device according to the present exemplary embodiment includes an intermediate transfer belt that has a surface to which a toner image is to be transferred, a primary transfer device that performs primary transfer of a toner image formed on a surface of a photoreceptor to a surface of the intermediate transfer belt, a secondary transfer device that performs secondary transfer of the toner image transferred to the surface of the intermediate transfer belt to a surface of a recording medium, and a cleaning blade that brings the aforementioned contact site into contact with the surface of the intermediate transfer belt to clean the surface.

As the cleaning blade, the belt cleaning blade according to the present exemplary embodiment is used.

The intermediate transfer belt in the transfer device according to the present exemplary embodiment is as described above.

The primary transfer device has a primary transfer member that is arranged to face the photoreceptor across the intermediate transfer belt. In the primary transfer device, by the primary transfer member, a voltage with polarity opposite to charging polarity of a toner is applied to the intermediate transfer member, such that primary transfer of a toner image to the outer peripheral surface of the intermediate transfer member is performed.

The secondary transfer device has a secondary transfer member that is arranged on a toner image-holding side of the intermediate transfer member. The secondary transfer device has, for example, a secondary transfer member and a back surface member that is arranged on the side opposite to the toner image-holding side of the intermediate transfer belt. In the secondary transfer device, the intermediate transfer belt and the recording medium are interposed between the secondary transfer member and the back surface member, and a transfer electric field is formed. In this way, the toner image transferred to the surface of the intermediate transfer belt is transferred to a recording medium by secondary transfer.

The secondary transfer member may be a secondary transfer roll or a secondary transfer belt. As the back surface member, for example, a back roll is used.

The transfer device according to the present exemplary embodiment may be a transfer device that transfers a toner image to the surface of a recording medium via a plurality of intermediate transfer belts. That is, the transfer device may be, for example, a transfer device of performing primary transfer of a toner image to a first intermediate transfer belt from a photoreceptor, performing secondary transfer of the toner image to a second intermediate transfer belt from the first intermediate transfer belt, and then performing tertiary transfer of the toner image to a recording medium from the second intermediate transfer belt.

Hitherto, the present exemplary embodiment has been described. However, the present exemplary embodiment is not limited to the above exemplary embodiments, and various modifications, changes, and ameliorations can be added thereto.

EXAMPLES

Examples of the present invention will be described below, but the present invention is not limited to the following examples. In the following description, unless otherwise specified, "parts" and "%" are based on mass in all cases.

Example A1

Preparation of Belt Cleaning Blade (CB1)

A polycaprolactone polyol (manufactured by Daicel Corporation, PLACCEL 205) and a polycaprolactone polyol (manufactured by Daicel Corporation, PLACCEL 240) are used as a hard segment material of a polyol component. Furthermore, an acrylic resin containing two or more hydroxy groups (Soken Chemical & Engineering Co., Ltd., ACTFLOW UMB-2005B) is used as a soft segment material. The aforementioned hard segment material and the soft segment material are mixed together at a ratio of 8:2 (mass ratio).

Then, as an isocyanate compound, 4,4'-diphenylmethane diisocyanate (manufactured by Nippon Polyurethane Industry Co., Ltd., MILLIONATE MT) is added to 100 parts of the mixture of the hard segment material and the soft segment material, and the obtained mixture is reacted at 70° C. for 3 hours in a nitrogen atmosphere. Subsequently, the aforementioned isocyanate compound is further added thereto, and the obtained mixture is reacted at 70° C. for 3 hours in a nitrogen atmosphere, thereby obtaining a prepolymer.

Thereafter, the prepolymer is heated to 100° C. and defoamed under reduced pressure for 1 hour. Then, a mixture of 1,4-butanediol and trimethylolpropane is added to the prepolymer and mixed for 3 minutes such that air bubbles are not created, thereby preparing a composition for molding a cleaning blade. The composition for molding a cleaning blade is poured into an adjusted centrifugal molding machine and subjected to a curing reaction.

Subsequently, the cleaning blade is immersed in a 4,4'-diphenylmethane diisocyanate (manufactured by TOSOH CORPORATION, MILLIONATE MT) bath at 80° C. for 5 minutes, then taken out of the bath, aged and heated, then dried at room temperature, and cut in a length of 15 mm and a thickness of 2 mm.

By the above operation, a belt cleaning blade (CB1) is obtained.

Examples A2 to A12

Preparation of Belt Cleaning Blades (CB2) to (CB12)

Cleaning blades (CB2) to (CB12) are obtained in the same manner as the cleaning blade (CB1), except that the ratio between the hard segment material and the soft segment material is changed such that the physical properties are adjusted as shown in the following Table 1.

Comparative Examples A1 to A8

Preparation of Belt Cleaning Blades (CBC1) to (CBC8)

Cleaning blades (CBC1) to (CBC8) are obtained in the same manner as the cleaning blade (CB1), except that the ratio between the hard segment material and the soft segment material is changed such that the physical properties are adjusted as shown in the following Table 1.

Measurement of Ratio X, Ratio Y, and Ratio Z

For the obtained belt cleaning blades of examples, the ratio X, the ratio Y, and the ratio Z are measured by the methods described above.

The results are shown in Table 1.

Preparation of Intermediate Transfer Belt

An intermediate transfer belt (BE1) consisting of a single polyimide-based resin layer is prepared. The surface roughness Rz on the outer peripheral surface of the intermediate transfer belt (BE1) is 0.07 μm.

Evaluation A

According to the combination shown in Table 1, the intermediate transfer belt and the intermediate transfer belt-cleaning blade are mounted on an image forming apparatus "ApeosPort-VI C7771 from FUJIFILM Business Innovation Corp.", thereby obtaining an image forming apparatus for evaluation. As conditions for mounting the intermediate transfer belt-cleaning blade, a pressing force NF (Normal Force) is set to 2.5 gf/mm, and an angle W/A (Working Angle) is set to 10°.

By using the image forming apparatus, the following evaluation is performed.

Evaluation of Abrasion Resistance and Chipping Resistance

By using the image forming apparatus for evaluation, images with an image density of 50% are printed on A4 paper (210×297 mm, FUJIFILM Business Innovation Corp., P paper) in an environment of 32.5° C. and 85% RH until the cumulative rotation number of the photoreceptor reaches 100,000 cycles. After the printing, the edge portion (the side portion in contact with the belt) of the cleaning blade is evaluated as below.

The abrasion loss of the edge portion of the cleaning blade is measured based on the maximum abrasion depth of the edge portion of the belt surface side, the maximum abrasion depth being checked in a case where the cleaning blade is observed with a laser microscope VK-8510 manufactured by KEYENCE CORPORATION. Based on the obtained values, the abrasion resistance was evaluated according to the following evaluation standard.

In addition, whether or not the edge portion of the cleaning blade is chipped and the size of the chip are observed with a laser microscope VK-8510 manufactured by KEYENCE CORPORATION. Based on the obtained observation results, the chipping resistance was evaluated according to the following evaluation standard.

Standard for Abrasion Resistance

G0: The abrasion loss of the edge portion is 1.5 μm or less.

G1: The abrasion loss of the edge portion is more than 1.5 μm and 3 μm or less.

G2: The abrasion loss of the edge portion is more than 3 μm and 5 μm or less.

G3: The abrasion loss of the edge portion is more than 5 μm and 7 μm or less.

G4: The abrasion loss of the edge portion is more than 7 μm and 10 μm or less.

G5: The abrasion loss of the edge portion is more than 10 μm.

Standard for Chipping Resistance

G0: No chipping occurs on the edge portion.

G1: The size of the chip of the edge portion is 1 μm or less, and the number of chips is 1 or more and less than 5.

G2: The size of the chip of the edge portion is 1 μm or less, and the number of chips is 5 or more.

G3: The size of the chip of the edge portion is more than 1 μm and 5 μm or less, and the number of chips is 1 or more and less than 3.

G4: The size of the chip of the edge portion is more than 1 μm and 5 μm or less, and the number of chips is 3 or more and less than 5.

G5: The size of the chip of the edge portion is more than 1 μm and 5 μm or less, and the number of chips is 5 or more.

TABLE 1

| | | Belt cleaning blade | | | | Evaluation A | |
|---|---|---|---|---|---|---|---|
| | Intermediate transfer belt | Type | Ratio X [%] | Ratio Y [%] | Ratio Z [%] | Abrasion resistance | Chipping resistance |
| Example A1 | (BE1) | (CB1) | 22.8 | 42.3 | 9.3 | G0 | G0 |
| Example A2 | (BE1) | (CB2) | 20.2 | 31.9 | 6.5 | G0 | G0 |
| Example A3 | (BE1) | (CB3) | 24.9 | 18.1 | 2.3 | G0 | G1 |
| Example A4 | (BE1) | (CB4) | 15.3 | 46.2 | 10.1 | G0 | G1 |
| Example A5 | (BE1) | (CB5) | 15.5 | 18.4 | 4.8 | G1 | G0 |
| Example A6 | (BE1) | (CB6) | 15.6 | 31.5 | 8.2 | G1 | G0 |
| Example A7 | (BE1) | (CB7) | 16.5 | 32.0 | 7.1 | G0 | G0 |
| Example A8 | (BE1) | (CB8) | 24.5 | 31.7 | 3.7 | G0 | G1 |
| Example A9 | (BE1) | (CB9) | 22.9 | 32.1 | 4.6 | G0 | G0 |
| Example A10 | (BE1) | (CB10) | 20.4 | 45.3 | 10.5 | G0 | G1 |
| Example A11 | (BE1) | (CB11) | 21.1 | 43.9 | 9.9 | G0 | G0 |
| Example A12 | (BE1) | (CB12) | 20.5 | 22.4 | 5.4 | G0 | G0 |
| Comparative Example A1 | (BE1) | (CBC1) | 14.8 | 17.7 | 4.6 | G2 | G0 |
| Comparative Example A2 | (BE1) | (CBC2) | 14.4 | 47.5 | 11.7 | G5 | G3 |

TABLE 1-continued

| | Intermediate transfer belt | Belt cleaning blade Type | Ratio X [%] | Ratio Y [%] | Ratio Z [%] | Evaluation A Abrasion resistance | Chipping resistance |
|---|---|---|---|---|---|---|---|
| Comparative Example A3 | (BE1) | (CBC3) | 25.7 | 46.6 | 12.0 | G0 | G5 |
| Comparative Example A4 | (BE1) | (CBC4) | 25.3 | 17.4 | 1.9 | G0 | G3 |
| Comparative Example A5 | (BE1) | (CBC5) | 13.5 | 32.5 | 8.6 | G4 | G0 |
| Comparative Example A6 | (BE1) | (CBC6) | 26.0 | 31.8 | 3.4 | G0 | G2 |
| Comparative Example A7 | (BE1) | (CBC7) | 20.7 | 48.1 | 11.2 | G0 | G4 |
| Comparative Example A8 | (BE1) | (CBC8) | 21.0 | 15.3 | 3.8 | G3 | G0 |

The above results tell that the belt cleaning blades of the present examples outperform the belt cleaning blades of comparative examples in terms of both the abrasion resistance and chipping resistance.

Example B1

Preparation of Photoreceptor Cleaning Blade (CP1)

A polycaprolactone polyol (manufactured by Daicel Corporation, PLACCEL 205) and a polycaprolactone polyol (manufactured by Daicel Corporation, PLACCEL 240) are used as a hard segment material of a polyol component. Furthermore, an acrylic resin containing two or more hydroxy groups (Soken Chemical & Engineering Co., Ltd., ACTFLOW UMB-2005B) is used as a soft segment material. The aforementioned hard segment material and the soft segment material are mixed together at a ratio of 8:2 (mass ratio).

Then, as an isocyanate compound, 4,4'-diphenylmethane diisocyanate (manufactured by Nippon Polyurethane Industry Co., Ltd., MILLIONATE MT) is added to 100 parts of the mixture of the hard segment material and the soft segment material, and the obtained mixture is reacted at 65° C. for 3 hours in a nitrogen atmosphere. Subsequently, the aforementioned isocyanate compound is further added thereto, and the obtained mixture is reacted at 65° C. for 3 hours in a nitrogen atmosphere, thereby obtaining a prepolymer.

Thereafter, the prepolymer is heated to 100° C. and defoamed under reduced pressure for 1 hour. Then, a mixture of 1,4-butanediol and trimethylolpropane is added to the prepolymer and mixed for 3 minutes such that air bubbles are not created, thereby preparing a composition for molding a cleaning blade. The composition for molding a cleaning blade is poured into an adjusted centrifugal molding machine and subjected to a curing reaction.

Subsequently, the cleaning blade is immersed in a 4,4'-diphenylmethane diisocyanate (manufactured by TOSOH CORPORATION, MILLIONATE MT) bath at 85° C. for 5 minutes, then taken out of the bath, aged and heated, then dried at room temperature, and cut in a length of 14 mm and a thickness of 1.8 mm.

By the above operation, a photoreceptor cleaning blade (CP1) is obtained.

Examples B2 to B12

Preparation of Belt Cleaning Blades (CP2) to (CB12)

Cleaning blades (CP2) to (CB12) are obtained in the same manner as the cleaning blade (CP1), except that the ratio between the hard segment material and the soft segment material is changed such that the physical properties are adjusted as shown in the following Table 2.

Comparative Examples B1 to B8

Preparation of Belt Cleaning Blades (CPC1) to (CPC8)

Cleaning blades (CPC1) to (CPC8) are obtained in the same manner as the cleaning blade (CP1), except that the ratio between the hard segment material and the soft segment material is changed such that the physical properties are adjusted as shown in the following Table 2.

Preparation of Photoreceptor

Manufacturing of Photoreceptor A

Zinc oxide (100 parts by mass, average particle size: 70 nm, manufactured by TAYCA Co., Ltd., specific surface area: 15 $m^2/g$) and 500 parts by mass of methanol are stirred and mixed together, and 0.75 parts by mass of KBM603 (manufactured by Shin-Etsu Chemical Co., Ltd.) is added thereto as a silane coupling agent, followed by stirring for 2 hours. Thereafter, methanol is distilled off under reduced pressure, followed by baking at 120° C. for 3 hours, thereby obtaining zinc oxide particles having undergone a surface treatment with a silane coupling agent.

A solution (38 parts by mass) obtained by dissolving 60 parts by mass of the zinc oxide particles having undergone a surface treatment, 1.2 parts by mass of an electron-accepting compound (4-ethoxy-1,2-dihydroxyanthraquinone) having the following structure, 13.5 parts by mass of blocked isocyanate (SUMIDULE 3173, manufactured by Sumika Bayer Urethane Co., Ltd.) as a curing agent, and 15 parts by mass of a butyral resin (S-LEC BM-1, manufactured by SEKISUI CHEMICAL CO., LTD.) in 85 parts by mass of methyl ethyl ketone is mixed with 25 parts by mass of methyl ethyl ketone, and the solution is dispersed for 4 hours in a sand mill using glass beads having a diameter of 1 mm, thereby obtaining a dispersion. Dioctyltin dilaurate (0.005 parts by mass) as a catalyst and 4.0 parts by mass of silicone resin particles (TOSPEARL 145, manufactured by Momentive Performance Materials Japan LLC) are added to the obtained dispersion, thereby obtaining a coating liquid for forming an undercoat layer. The viscosity of the coating liquid for forming an undercoat layer at a coating temperature (24° C.) is 235 mPa·s.

An aluminum substrate having a diameter of 30 mm is coated with the coating liquid at a coating rate of 220 mm/min by an immersion coating method, followed by drying and curing at 180° C. for 40 minutes, thereby obtaining an undercoat layer having a thickness of 25 μm.

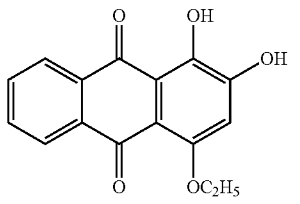 [SMILES: CCOc1cc(O)c(O)c2c1C(=O)c1ccccc1C2=O]

Next, as a charge generation material, a mixture consisting of 15 parts by mass of hydroxygallium phthalocyanine crystals having strong diffraction peaks at the Bragg's angles (2θ±0.2°) of at least 7.5°, 9.9°, 12.5°, 16.3°, 18.6°, 25.1°, and 28.3° with respect to X-rays having Cukα characteristic, 10 parts by mass of a vinyl chloride-vinyl acetate copolymer resin (VMCH, Nippon Union Carbide Corporation), and 300 parts by mass of n-butyl alcohol is dispersed for 4 hours in a sand mill using glass beads having a diameter of 1 mm, thereby obtaining a coating liquid for forming a charge generation layer. The viscosity of the coating liquid for forming a charge generation layer at a coating temperature (24° C.) is 1.8 mPa·s. The undercoat layer is immersion-coated with the coating liquid at a coating rate of 65 mm/min by an immersion coating method, followed by drying at 150° C. for 10 minutes, thereby obtaining a charge generation layer.

Next, 1.6 parts by mass of a compound represented by the following Structural Formula 1 and 3 parts by mass of N, N'-bis(3-methylphenyl)-N,N'-diphenylbenzidine as charge transport materials, 6 parts by mass of a polycarbonate copolymer (viscosity-average molecular weight 53,000) consisting of a structural unit represented by the following Structural Formula 2 and a structural unit represented by the following Structural Formula 3 as binder resins, and 0.1 parts by mass of 2,6-di-t-butyl-4-methylphenol as an anti-oxidant are mixed together, and 24 parts by mass of tetra-hydrofuran and 11 parts by mass of toluene are mixed and dissolved therein, thereby obtaining a mixed solution.

Ether-modified silicone oil (5 ppm, trade name: KP340, manufactured by Shin-Etsu Chemical Co., Ltd.) is added to the mixed solution, and the mixture is thoroughly stirred, thereby obtaining a coating liquid for forming a charge transport layer. The charge generation layer is coated with this coating liquid to a thickness of 40 μm and dried at 143° C. for 40 minutes to form a charge transport layer. In this way, a target electrophotographic photoreceptor is obtained. The electrophotographic photoreceptor obtained in this way was named photoreceptor A. The friction coefficient of the charge transport layer of the photoreceptor A is 0.97.

Structural Formula 1

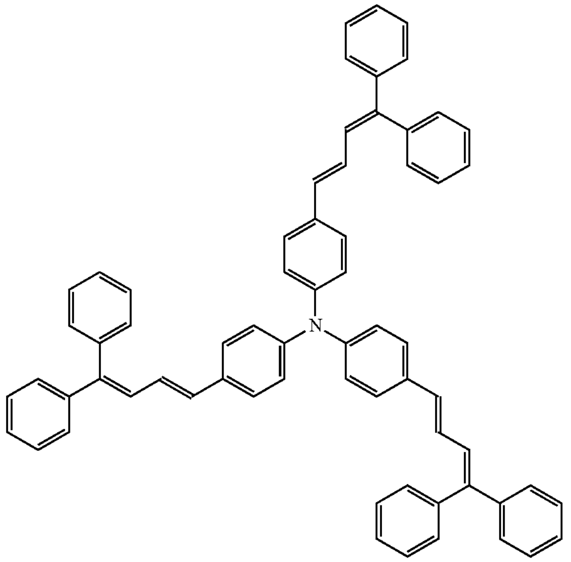

Structural Formula 2

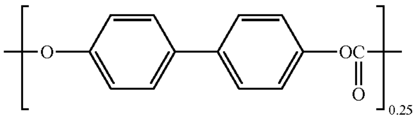

Structural Formula 3

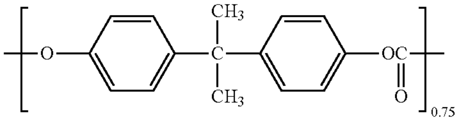

Preparation of Photoreceptor B

The surface of the photoreceptor A is treated using a friction tester HEIDON with control of load applied, thereby forming projections each having a height of 5 μm and a width of 20 μm.

The obtained photoreceptor having the projections on the surface thereof is named photoreceptor B.

Evaluation B

The photoreceptor A or photoreceptor B and the photo-receptor cleaning blade shown in the following Table 2 are mounted on an image forming apparatus "Apeos C8180 from FUJIFILM Business Innovation Corp.", thereby obtaining an image forming apparatus for evaluation. As conditions for mounting the photoreceptor cleaning blade, a pressing force NF (Normal Force) is set to 2.0 gf/mm, and an angle W/A (Working Angle) is set to 18°.

By using the image forming apparatus, the following evaluation is performed.

Cleanliness Evaluation

By using the image forming apparatus for evaluation (image forming apparatus on which the photoreceptor A is mounted), black halftone images with an image density of 5% are printed on A4 paper (210×297 mm, FUJIFILM Business Innovation Corp., P paper) in an environment of 28° C. and 80% RH. Then, one black halftone image with an image density of 80% is printed, and the cleanliness of the printed image is evaluated according to the following evaluation standard.

Standard

G1: No streaks

G2: There are slight streaks that can be checked with a microscope or the like.

G3: There are slight streaks that can be seen.

G4: There are clear linear streaks.

Chipping Resistance Evaluation

By using the image forming apparatus for evaluation (image forming apparatus on which the photoreceptor B is mounted), black halftone images with an image density of 5% are printed on 100 sheets of A4 paper (210×297 mm, FUJIFILM Business Innovation Corp., P paper) in an environment of 10° C. and 20% RH. After the printing, the abrasion loss of the contact portion between the photoreceptor and the projections, the contact portion being in the edge portion of the cleaning blade (the portion of side coming into contact with the photoreceptor), is measured. Based on the obtained values, the chipping resistance was evaluated according to the following evaluation standard.

Standard

G1: No abrasion occurs or the abrasion loss is less than 1 μm.

G2: The abrasion loss is 1 μm or more and less than 5 μm.

G3: The abrasion loss is 5 μm or more and less than 10 μm.

G4: The abrasion loss is 10 μm or more.

TABLE 2

| | Photoreceptor cleaning blade | | | | Evaluation B | |
|---|---|---|---|---|---|---|
| | Type | Ratio X [%] | Ratio Y [%] | Ratio Z [%] | Cleanliness | Chipping resistance |
| Example B1 | (CP1) | 20.0 | 32.2 | 5.6 | G1 | G1 |
| Example B2 | (CP2) | 14.9 | 17.8 | 2.2 | G1 | G1 |
| Example B3 | (CP3) | 14.9 | 46.5 | 9.2 | G2 | G2 |
| Example B4 | (CP4) | 25.1 | 17.8 | 3.3 | G2 | G1 |
| Example B5 | (CP5) | 25.1 | 46.5 | 11.0 | G1 | G2 |
| Example B6 | (CP6) | 15.5 | 32.0 | 5.6 | G2 | G1 |
| Example B7 | (CP7) | 16.6 | 31.0 | 5.6 | G2 | G1 |
| Example B8 | (CP8) | 24.3 | 33.0 | 5.6 | G1 | G2 |
| Example B9 | (CP9) | 22.1 | 33.0 | 5.6 | G2 | G2 |
| Example B10 | (CP10) | 19.1 | 47.0 | 5.6 | G2 | G2 |
| Example B11 | (CP11) | 19.0 | 44.0 | 5.6 | G2 | G2 |
| Example B12 | (CP12) | 19.3 | 22.0 | 5.6 | G1 | G2 |
| Comparative Example B1 | (CPC1) | 14.4 | 47.0 | 12.2 | G3 | G3 |
| Comparative Example B2 | (CPC2) | 25.5 | 47.0 | 14.8 | G2 | G4 |
| Comparative Example B3 | (CPC3) | 14.4 | 17.3 | 2.0 | G4 | G1 |
| Comparative Example B4 | (CPC4) | 25.5 | 17.3 | 1.8 | G3 | G1 |
| Comparative Example B5 | (CPC5) | 14.8 | 22.1 | 5.6 | G3 | G2 |
| Comparative Example B6 | (CPC6) | 25.4 | 20.3 | 5.6 | G2 | G3 |
| Comparative Example B7 | (CPC7) | 15.5 | 46.7 | 5.6 | G3 | G3 |
| Comparative Example B8 | (CPC8) | 15.5 | 17.2 | 5.6 | G3 | G1 |

The above results tell that the photoreceptor cleaning blades of the present examples outperform the photoreceptor cleaning blades of comparative examples in terms of both the cleanliness and chipping resistance.

Hereinafter, aspects of the present invention will be additionally described.

(((1)))

A belt cleaning blade comprising:

a contact site that comes into contact with at least a surface of a belt which is a member to be cleaned, wherein the contact site is configured with polyurethane rubber including hard segments and soft segments, and in a cross section of the contact site, a ratio X of domains of the hard segments to a total area of the cross section is 14.9% or more and 25.1% or less, and a ratio Y of an area of domains of the hard segments having an area of 200 $nm^2$ or more and 1,000 $nm^2$ or less to a total area of the domains of the hard segments in the cross section is 17.8% or more and 46.5% or less.

(((2)))

The belt cleaning blade according to (((1))), wherein the ratio X is 16.0% or more.

(((3)))

The belt cleaning blade according to (((1))) or (((2))), wherein the ratio X is 24.0% or less.

(((4)))

The belt cleaning blade according to any one of (((1))) to (((3))), wherein the ratio Y is 45.0% or less.

(((5)))

The belt cleaning blade according to (((1))), wherein the ratio X is 16.0% or more and 24.0% or less.

(((6)))

The belt cleaning blade according to (((1))), wherein the ratio X is 16.0% or more and 24.0% or less, and the ratio Y is 17.8% or more and 45.0% or less.

(((7)))

The belt cleaning blade according to any one of (((1))) to (((6))), wherein a ratio Z of the number of domains of the hard segments having an area of 200 $nm^2$ or more and 1,000 $nm^2$ or less to a total number of domains of the hard segments in the cross section is 2.2% or more and 11.1% or less.

(((8)))

A photoreceptor cleaning blade comprising:

a contact site that comes into contact with a surface of a photoreceptor having a surface friction coefficient of 0.85 or more, wherein the contact site is configured with polyurethane rubber including hard segments and soft segments, and in a cross section of the contact site, a ratio X of domains of the hard segments to a total area of the cross section is 14.9% or more and 25.1% or less, and a ratio Y of an area of domains of the hard segments having an area of 200 $nm^2$ or more and 1,000 $nm^2$ or less to a total area of the domains of the hard segments in the cross section is 17.8% or more and 46.5% or less.

(((9)))

The photoreceptor cleaning blade according to (((8))), wherein the ratio X is 16.0% or more.

(((10)))

The photoreceptor cleaning blade according to (((8))) or (((9))), wherein the ratio X is 24.0% or less.

(((11)))

The photoreceptor cleaning blade according to any one of (((8))) to (((10))), wherein the ratio Y is 45.0% or less.

(((12)))

The photoreceptor cleaning blade according to (((8))), wherein the ratio X is 16.0% or more and 24.0% or less.

(((13)))

The photoreceptor cleaning blade according to (((8))), wherein the ratio X is 16.0% or more and 24.0% or less, and the ratio Y is 17.8% or more and 45.0% or less.

(((14)))

The photoreceptor cleaning blade according to any one of (((8))) to (((13))), wherein a ratio Z of the number of domains of the hard segments having an area of 200 $nm^2$ or more and 1,000 $nm^2$ or less to a total number of domains of the hard segments in the cross section is 2.2% or more and 11.1% or less.

(((15)))

An image forming apparatus, comprising:

a photoreceptor, a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the cleaning blade according to any one of (((1))) to (((7))) that brings the contact site into contact with a surface of the belt to clean the surface.

(((16)))

A transfer device comprising:

an intermediate transfer belt that has a surface to which a toner image is to be transferred;

a primary transfer device that performs primary transfer of a toner image formed on the surface of a photoreceptor to a surface of an intermediate transfer belt;

a secondary transfer device that performs secondary transfer of the toner image transferred to the surface of the intermediate transfer belt to a surface of a recording medium; and the belt cleaning blade according to any one of (((1))) to (((7))) that brings the contact site into contact with a surface of the intermediate transfer belt to clean the surface.

(((17)))

A cleaning device comprising:

the photoreceptor cleaning blade according to any one of (((8))) to (((14))).

(((18)))

An image forming apparatus comprising:

a photoreceptor having a surface friction coefficient of 0.85 or more;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium; and the photoreceptor cleaning blade according to any one of (((8))) to (((14))) that brings the contact site into contact with the surface of the photoreceptor to which the toner image has been transferred by the transfer device to clean the surface.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A belt cleaning blade comprising:

a contact site that comes into contact with at least a surface of a belt which is a member to be cleaned, wherein the contact site is configured with polyurethane rubber including hard segments and soft segments, and in a cross section of the contact site, a ratio X of domains of the hard segments to a total area of the cross section is 14.9% or more and 25.1% or less, and a ratio Y of an area of domains of the hard segments having an area of 200 $nm^2$ or more and 1,000 $nm^2$ or less to a total area of the domains of the hard segments in the cross section is 17.8% or more and 46.5% or less.

2. The belt cleaning blade according to claim 1, wherein the ratio X is 16.0% or more.

3. The belt cleaning blade according to claim 1, wherein the ratio X is 24.0% or less.

4. The belt cleaning blade according to claim 1, wherein the ratio Y is 45.0% or less.

5. The belt cleaning blade according to claim 1, wherein the ratio X is 16.0% or more and 24.0% or less.

6. The belt cleaning blade according to claim 1, wherein the ratio X is 16.0% or more and 24.0% or less, and the ratio Y is 17.8% or more and 45.0% or less.

7. The belt cleaning blade according to claim 1, wherein a ratio Z of the number of the domains of the hard segments having an area of 200 $nm^2$ or more and 1,000 $nm^2$ or less to a total number of the domains of the hard segments in the cross section is 2.2% or more and 11.1% or less.

8. An image forming apparatus, comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 1 that brings the contact site into contact with a surface of the belt to clean the surface.

9. An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 2 that brings the contact site into contact with a surface of the belt to clean the surface.

10. An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 3 that brings the contact site into contact with a surface of the belt to clean the surface.

11. A transfer device comprising:

an intermediate transfer belt that has a surface to which a toner image is to be transferred;

a primary transfer device that performs primary transfer of a toner image formed on the surface of a photoreceptor to a surface of an intermediate transfer belt;

a secondary transfer device that performs secondary transfer of the toner image transferred to the surface of the intermediate transfer belt to a surface of a recording medium; and the belt cleaning blade according to claim 1 that brings the contact site into contact with a surface of the intermediate transfer belt to clean the surface.

12. A photoreceptor cleaning blade comprising:

a contact site that comes into contact with a surface of a photoreceptor having a surface friction coefficient of 0.85 or more, wherein the contact site is configured with polyurethane rubber including hard segments and soft segments, and in a cross section of the contact site, a ratio X of domains of the hard segments to a total area of the cross section is 14.9% or more and 25.1% or less, and a ratio Y of an area of domains of the hard segments having an area of 200 $nm^2$ or more and 1,000 $nm^2$ or less to a total area of the domains of the hard segments in the cross section is 17.8% or more and 46.5% or less.

13. The photoreceptor cleaning blade according to claim 12, wherein the ratio X is 16.0% or more.

14. The photoreceptor cleaning blade according to claim 12, wherein the ratio X is 24.0% or less.

15. The photoreceptor cleaning blade according to claim 12, wherein the ratio Y is 45.0% or less.

16. The photoreceptor cleaning blade according to claim 12, wherein the ratio X is 16.0% or more and 24.0% or less.

17. The photoreceptor cleaning blade according to claim 12, wherein the ratio X is 16.0% or more and 24.0% or less, and the ratio Y is 17.8% or more and 45.0% or less.

18. The photoreceptor cleaning blade according to claim 12, wherein a ratio Z of the number of the domains of the hard segments having an area of 200 $nm^2$ or more and 1,000 $nm^2$ or less to a total number of the domains of the hard segments in the cross section is 2.2% or more and 11.1% or less.

19. A cleaning device comprising:

the photoreceptor cleaning blade according to claim 12.

20. An image forming apparatus comprising:

a photoreceptor having a surface friction coefficient of 0.85 or more;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium; and the photoreceptor cleaning blade according to claim 12 that brings the contact site into contact with the surface of the photoreceptor to which the toner image has been transferred by the transfer device to clean the surface.

* * * * *